United States Patent
Hammad

(10) Patent No.: US 7,836,820 B2
(45) Date of Patent: Nov. 23, 2010

(54) BREWING DEVICE HAVING A DELAYED RELEASE MECHANISM

(75) Inventor: Jamal Hammad, Boynton Beach, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 590 days.

(21) Appl. No.: 11/857,540

(22) Filed: Sep. 19, 2007

(65) Prior Publication Data

US 2009/0074930 A1 Mar. 19, 2009

(51) Int. Cl.
*A47J 31/06* (2006.01)

(52) U.S. Cl. .............................. 99/299; 99/306; 99/307; 99/323; 426/433

(58) Field of Classification Search .................. 99/299, 99/306, 307, 323, 302 R; 426/433
See application file for complete search history.

(56) References Cited

U.S. PATENT DOCUMENTS

| | | | | |
|---|---|---|---|---|
| 1,895,857 A | * | 1/1933 | Mockbee | ..................... 99/299 |
| 3,561,506 A | | 2/1971 | Johnson | |
| 4,255,265 A | * | 3/1981 | Greutert | ..................... 210/474 |
| 4,748,901 A | | 6/1988 | Burmeister | |
| 4,867,349 A | | 9/1989 | Stone, Jr. | |
| 4,924,922 A | | 5/1990 | Johnson | |
| 4,997,015 A | | 3/1991 | Johnson | |
| 5,472,719 A | * | 12/1995 | Favre | .......................... 426/77 |
| 5,522,556 A | | 6/1996 | Knepler | |
| 5,699,719 A | | 12/1997 | Lucas | |
| 5,813,319 A | | 9/1998 | Lee | |
| 5,943,944 A | | 8/1999 | Lassota | |
| 5,947,004 A | * | 9/1999 | Huang | ......................... 99/299 |
| 5,957,036 A | | 9/1999 | Wairner | |
| 5,964,141 A | | 10/1999 | Andrew | |
| 6,021,706 A | * | 2/2000 | Seguenot et al. | .............. 99/319 |
| 6,155,158 A | | 12/2000 | Anson | |
| 6,182,554 B1 | | 2/2001 | Beaulieu | |
| RE37,173 E | * | 5/2001 | Jefferson et al. | .............. 99/299 |
| 6,286,415 B1 | | 9/2001 | Leung | |
| 6,857,355 B2 | * | 2/2005 | Rolland | .................... 99/302 R |
| 7,047,869 B2 | | 5/2006 | Leung | |

* cited by examiner

*Primary Examiner*—Reginald L Alexander
(74) *Attorney, Agent, or Firm*—Lawrence J. Shurupoff

(57) ABSTRACT

A drip coffee maker is provides including a means for delaying the release of brewed coffee from the brew basket assembly position in a brew basket housing. The brew basket assembly includes an upper basket portion vertically movably mounted with respect to a lower basket portion. A bias member is interposed between the basket portions, vertically biasing the upper basket portion with respect to the lower basket portion. A basket valve is included in the upper and lower basket portions, and is actuatable between an open and a closed position. A carafe is included, and has a lid portion with a lid aperture therein. The carafe is removably positionable under the brew basket assembly with the lid aperture proximal to the basket valve. The basket valve opens when the weight of the hot water and coffee grounds in the upper basket portion exceeds a threshold weight of the bias members.

16 Claims, 11 Drawing Sheets

US 7,836,820 B2

BREWING DEVICE HAVING A DELAYED RELEASE MECHANISM

FIELD OF THE INVENTION

The present disclosure relates to coffee makers, and in particular, to a drip type coffee maker having a delayed release mechanism.

BACKGROUND OF THE INVENTION

In conventional electric drip coffee makers, water is poured into a reservoir and is heated. The heated water is pumped onto coffee grounds in a brew basket to drip into an opening in a top of a carafe. A number of drip coffee makers utilize glass carafes and warming plates. However, significant heat loss through the surface of the glass carafe and contact with cold air as the coffee drips into the opening in the top of the carafe can result in a substantial temperature loss in the brewed coffee.

In some drip coffee makers, the coffee is brewed into a thermal carafe. Exemplary thermal carafes can be made using either a glass vacuum flask or stainless steel vacuum flask. A tightly fitted lid is usually present to prevent cooler air from entering the carafe. However, the coffee still contacts the cold air as the coffee drips into the opening in the top of a carafe, again resulting in a substantial temperature loss.

SUMMARY OF THE INVENTION

The present disclosure provides a drip coffee maker including a means for a delayed release of brewed coffee from the brew basket into the carafe. The coffee maker includes a base, reservoir housing, and brew basket housing, where a carafe is removably positionable under the brew basket housing.

A brew basket assembly is positionable in the brew basket housing. The brew basket assembly includes a lower basket portion having a first exit aperture and an upper basket portion vertically movably mounted with respect to the lower basket portion. The upper basket portion includes a second exit aperture, the second exit aperture being adjacent to the first exit aperture.

A bias member is interposed between the lower and upper basket portions, wherein the bias member vertically biases the upper basket portion with respect to the lower basket portion. The bias member vertically biases the upper basket portion a distance "A" from the lower basket portion when the upper basket portion includes a weight below a threshold weight of the bias member. A basket valve is position adjacent to the first and second exit apertures.

The carafe includes a lid portion having a lid aperture. The carafe is removably positionable under the brew basket assembly with the lid aperture being proximal to the basket valve when the carafe is positioned under the brew basket assembly. The basket valve is actuatable between an open and a closed position.

In use, the bias member compresses when the weight included within the upper basket portion exceeds the threshold weight, decreasing the vertical distance between the upper and lower basket portions. The decreasing vertical distance between the upper and lower basket portions actuates the basket valve to the open position.

When the weight included within the upper basket portion decreases below the threshold weight the bias member expands, increasing the vertical distance between the upper and lower basket portions. The increasing vertical distance between the upper and lower basket portions actuates the basket valve to the closed position.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION OF THE INVENTION

Figure 1:
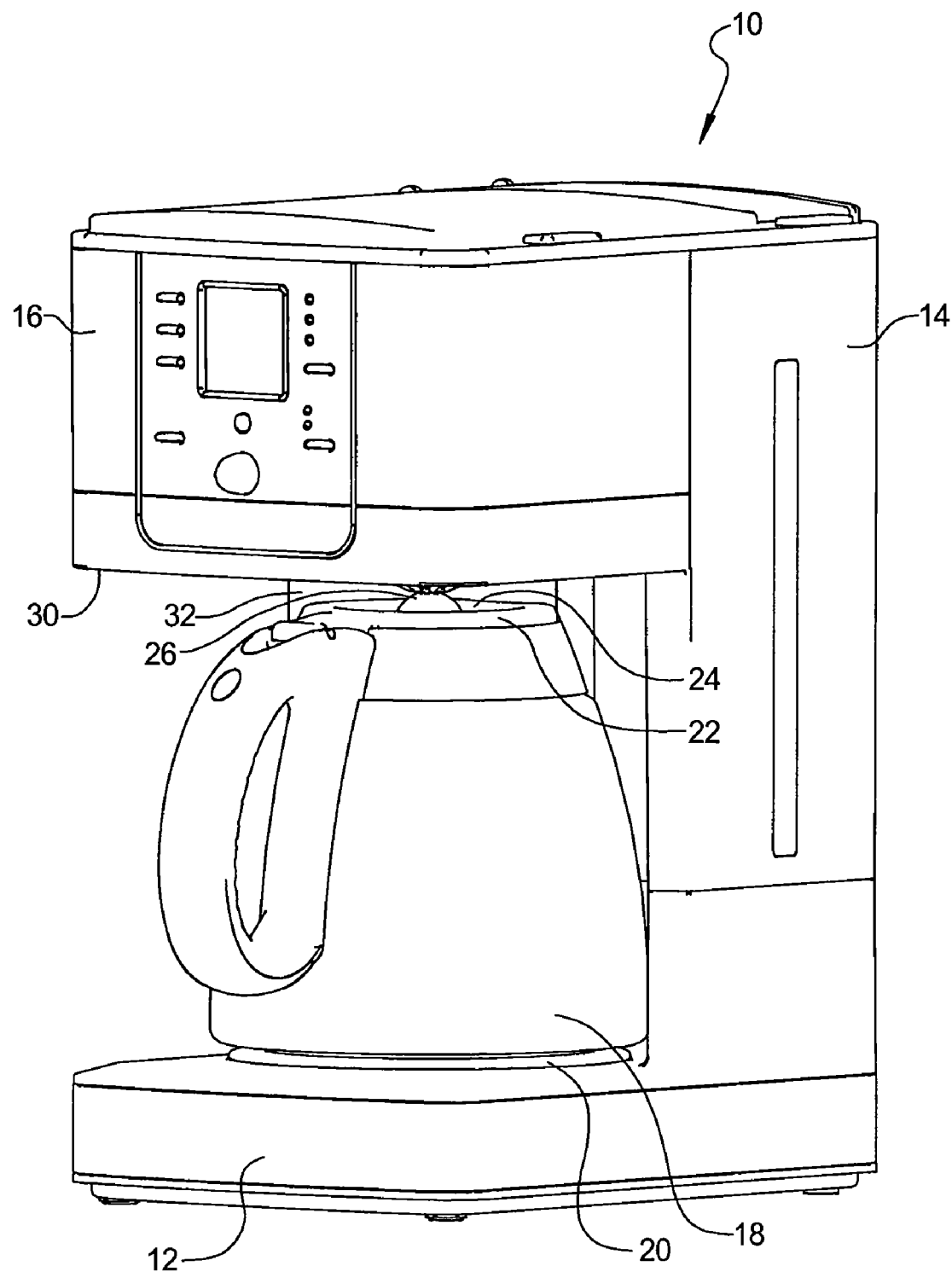
FIG. 1 depicts an isometric view of a prior art drip type coffee maker.
Figure 2:
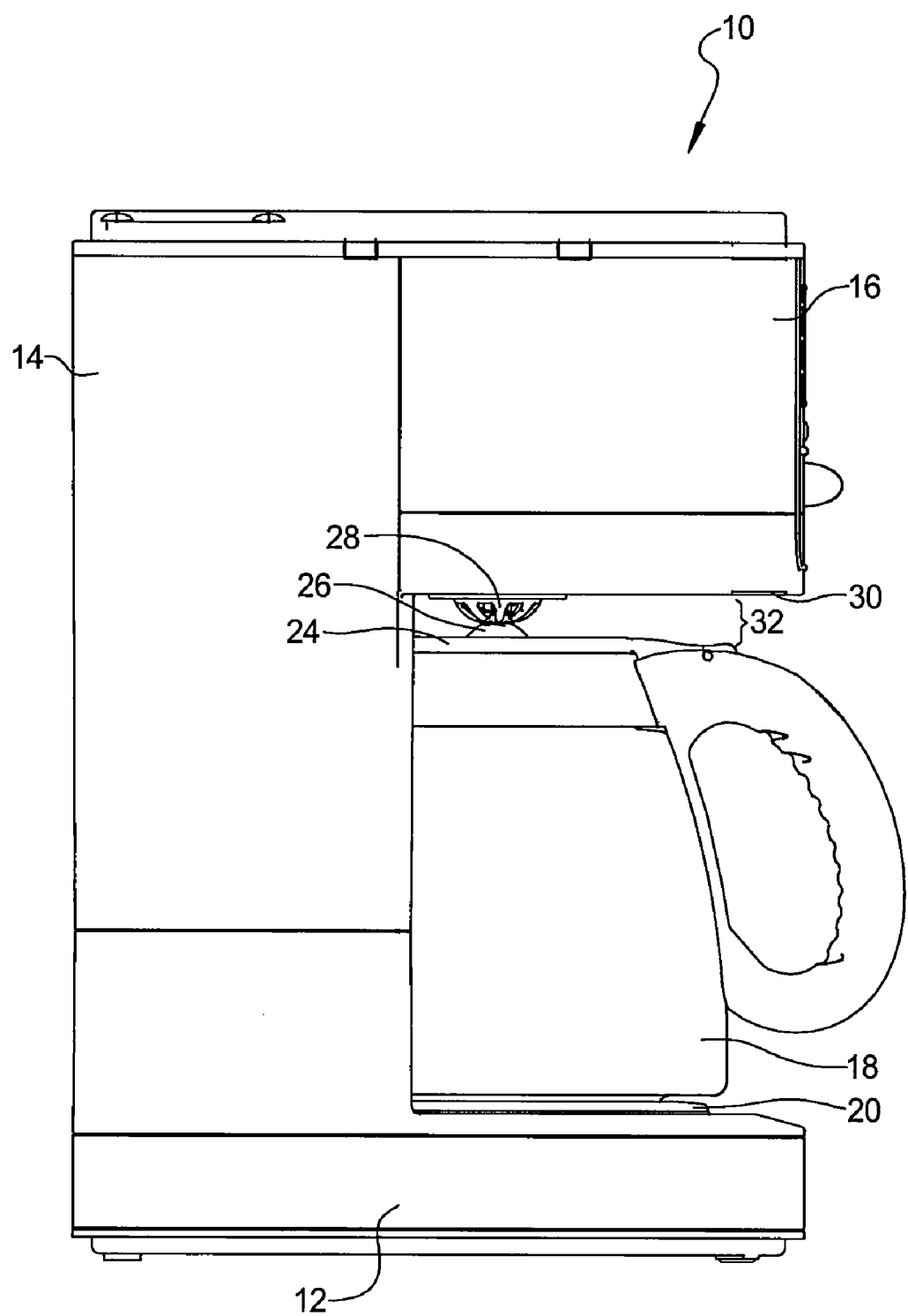
FIG. 2 depicts a side view of the prior art drip type coffee maker of FIG. 1.

Referring now to the drawing figures in which like reference designators refer to like elements, there is shown in FIGS. 1 and 2 a prior art drip type coffee maker 10. The coffee maker 10 includes a base 12, reservoir housing 14, and brew basket housing 16, where a carafe 18 is positionable on the base 12. The base 12 can include a heating plate 20 for maintaining the temperature of the brewed coffee in the carafe 18.

The carafe 18 includes a carafe lid 24 having an aperture 26 configured for receiving the brewed coffee there through. The carafe 18 is positioned under the brew basket housing 16 such that the carafe lid 24 is proximal to an exit aperture 28 in a bottom surface 30 of the brew basket housing 16. The exit aperture 28 is aligned with the aperture 26 in the carafe lid 24 to supply the brewed coffee into the carafe 18.

As the coffee is brewed, the coffee drips from the exit aperture 28 into and through the aperture 26 into the carafe 18. The exit aperture 28 and the aperture 26 are positioned in a gap 32 between the bottom surface 30 and the carafe lid 24, such that the dripping coffee is exposed to cold air infiltrating the gap 32. The cold air decreases the temperature of the coffee as it drips from the exit aperture 28 into the aperture 26.

Figure 3:
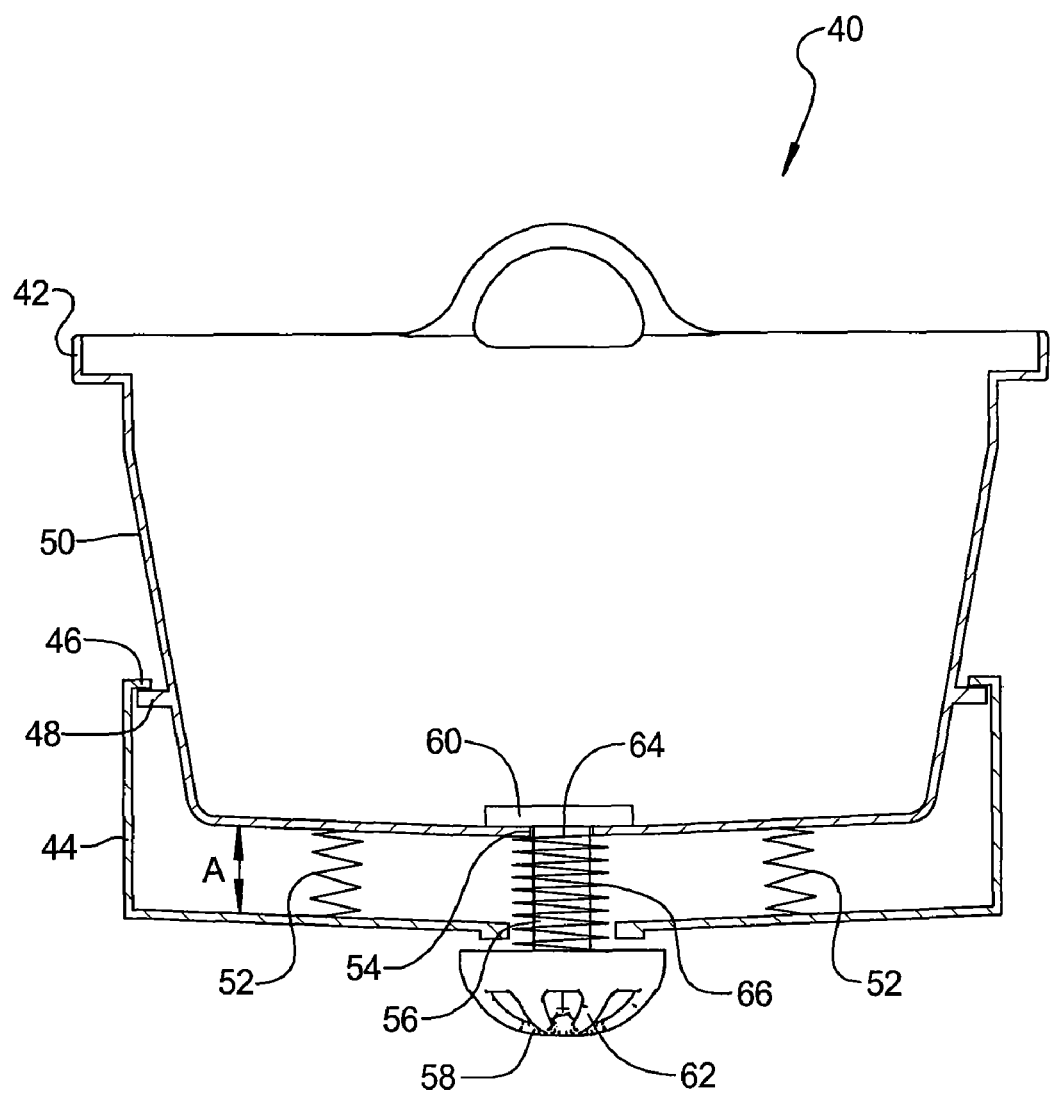
FIG. 3 depicts a cross-sectional view of a brew basket assembly of the present disclosure.

Referring to FIG. 3, a brew basket housing 16 includes a brew basket assembly 40 positionable therein. The brew basket assembly 40 includes an upper basket portion 42 slidingly mounted with respect to a lower basket portion 44, where the upper basket portion 42 is configured to receive coffee grounds therein. The lower basket portion 44 includes a lip 46 which is engagable by a stop 48 positioned on the outer surface 50 of the upper basket portion 42. The lip 46 and stop 48 interact to limit the vertical travel of the upper basket portion 42 within the lower basket portion 44.

Bias members 52 are interposed between the upper and lower basket portions 42 and 44, thereby vertically biasing the upper basket portion 42 with respected to the lower basket 44. The bias members 52 bias and maintain the upper basket portion 42 a distance "A" from the lower basket portion 44 in an un-weighted condition.

The upper and lower basket portions 42, 44 each include exit apertures 54 and 56. A basket valve 58 is positioned adjacent to the exit apertures 54 and 56. The basket valve 58 includes a seal 60 and output head 62 affixed to opposite ends of a shaft 64. The seal 60 is positioned over exit aperture 54, on the interior of the upper basket portion 42. The shaft 64 extends through the apertures 54, 56, positioning the output head 62 exterior to the lower basket portion 44. A spring 66 is positioned about the shaft 64, interposed between the upper basket portion 42 and the output head 62. The spring 66 biases the seal 60 against the interior of the upper basket portion 42 closing, sealing, the exit aperture 54 on the upper basket portion 42. To open the basket valve 58 a force is applied against the output head 62, compressing the spring 66 and separating the seal 60 from the exit aperture 54.

While the basket valve 58 is depicted to include spring 66 to bias the basket valve 58 into a closed position, it is contemplated that the spring 66 to can be replaced within any flexible elastic object used to store mechanical energy, which can bias the basket valve 58 into a closed position.

Figure 4:
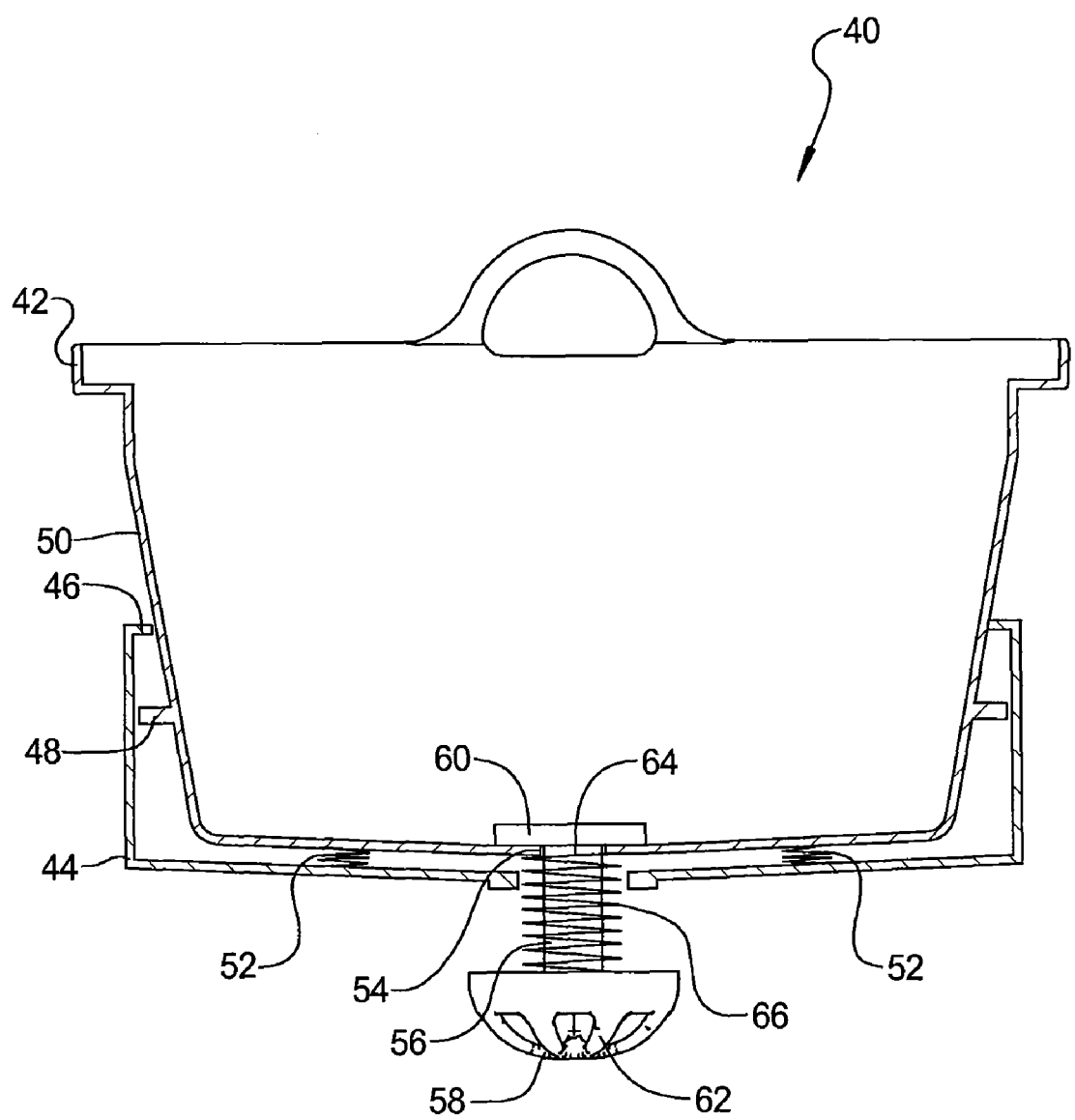
FIG. 4 depicts a cross-sectional view of the brew basket assembly of FIG. 3 in a weighted position.

Referring to FIG. 4, the bias members 52 are selected to maintain the upper basket portion 42 the distance "A" from the lower basket portion 44, until a threshold weight is present in the upper basket portion 42. When the threshold weight is exceeded, the bias members 52 compress permitting the upper basket portion 42 to move downwardly with respect to the lower basket portion 44. If the weight within the upper basket portion 42 is decreased below that of the threshold weight, the bias members 52 raise the upper basket portion 42 with respect to the lower basket portion 44, where the lip 46 and stop 48 limit the extent of travel.

The threshold weight is a design feature of a coffee maker, which is related to the size of the coffee maker, namely, 2-cup, 4-cup, etc. The threshold weight is a preset weight which is greater then the combined weight of a specified amount of dry coffer grounds and a specific amount of added hot water deposited within the upper basket portion 42. The bias members 52 are selected to compress after the combined weight exceeds the threshold weight.

Figure 5:
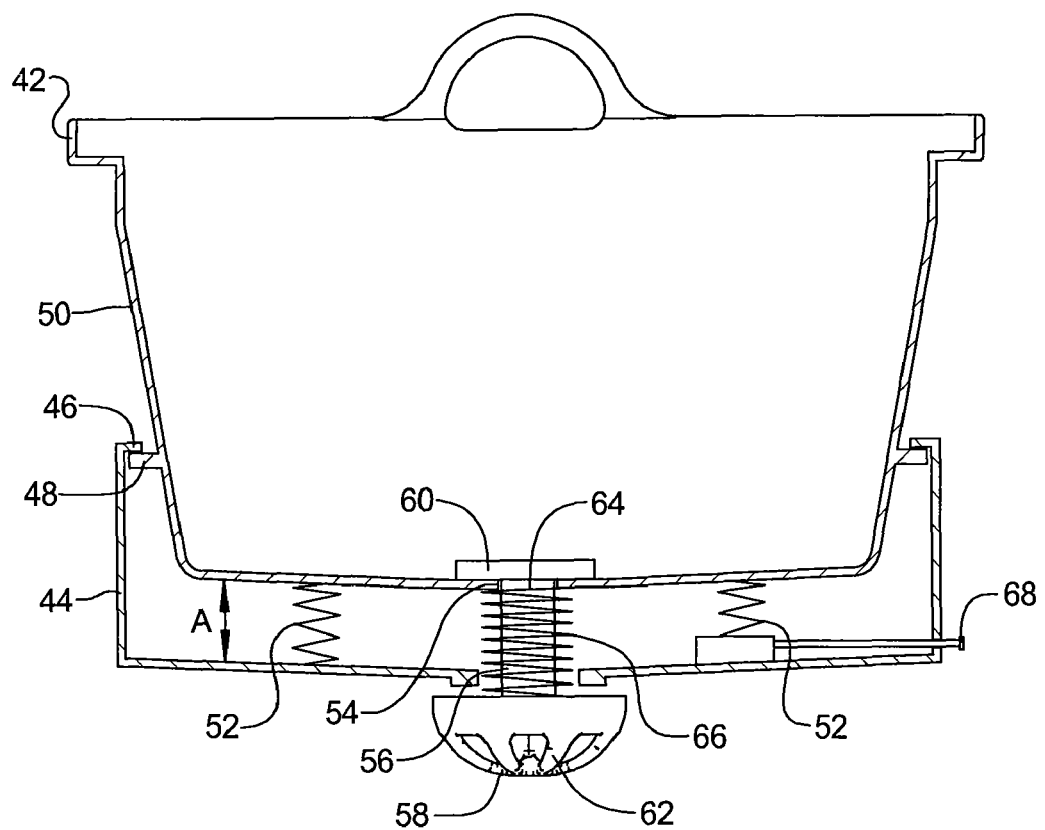
FIG. 5 depicts a cross-sectional view of a brew basket assembly of FIG. 3 including a threshold weight control mechanism.

While the figures depict the bias members 52 as fixed springs, it is contemplated that the bias members 52 can be any flexible elastic object used to store mechanical energy, which provide a counter active force to compression. Referring to FIG. 5, it is further contemplated that the force provided by the bias members 52 can be adjustable to a specific amount of coffee to be brewed. The brew basket assembly 40 can include an adjustment mechanism 68 for adjusting the force of the bias members 52, either increasing or decreasing the threshold force. In this manner, a single coffee maker can be used to brew varying amount of coffee, i.e. 2-cup, 4-cup, etc.

In use, coffee grounds are placed within the upper basket portion 42. The coffee grounds are initially provided in a dry state, having a weight less than that of the threshold weight. In this manner, the bias members 52 maintain the upper basket portion 42 the distance "A" from the lower basket portion 44. As the coffee grounds are wetted with hot water, the weight of the wetted coffee grounds and accumulated hot water increases, ultimately exceeding the threshold weight. When the threshold weight is exceeded, the bias members 52 compress permitting the upper basket portion 42 to move downwardly with respect to the lower basket portion 44. If the weight of the wetted coffee grounds and accumulated hot water is decreased below that of the threshold weight, the bias members 52 raise the upper basket portion 42 with respect to the lower basket portion 44.

Figure 6:
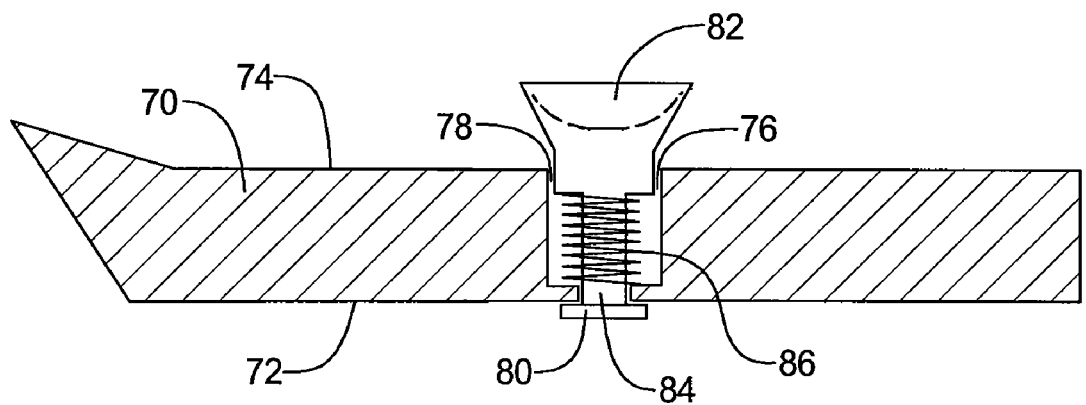
FIG. 6 depicts a cross-sectional view of a carafe lid of the present disclosure.

Referring to FIG. 6, a carafe lid 70 includes outer and inner surfaces 72, 74 having an input aperture 76 there through. A lid valve 78 is positioned adjacent to the input aperture 76. The lid valve 78 includes a seal 80 and input head 82 affixed to opposite ends of a shaft 84. The seal 80 is positioned over the input aperture 76, on the inner surface 74 of the carafe lid 70. The shaft 84 extends through the input aperture 76, positioning the input head 82 proximal to the outer surface 72. A spring 86 is positioned about the shaft 84 within the input aperture 76. The spring 86 biases the seal 80 against the inner surface 74 of the carafe lid 70 closing, sealing, the aperture 76. To open the lid valve 78, a force is applied against the input head 82, compressing the spring 86 and separating the seal 80 from the aperture 76.

While the lid valve 78 is depicted as a spring 86 to bias the lid valve 78 into a closed position, it is contemplated that the spring 86 to can be replaced within any flexible elastic object used to store mechanical energy, which can bias the lid valve 78 into a closed position.

Figure 7:
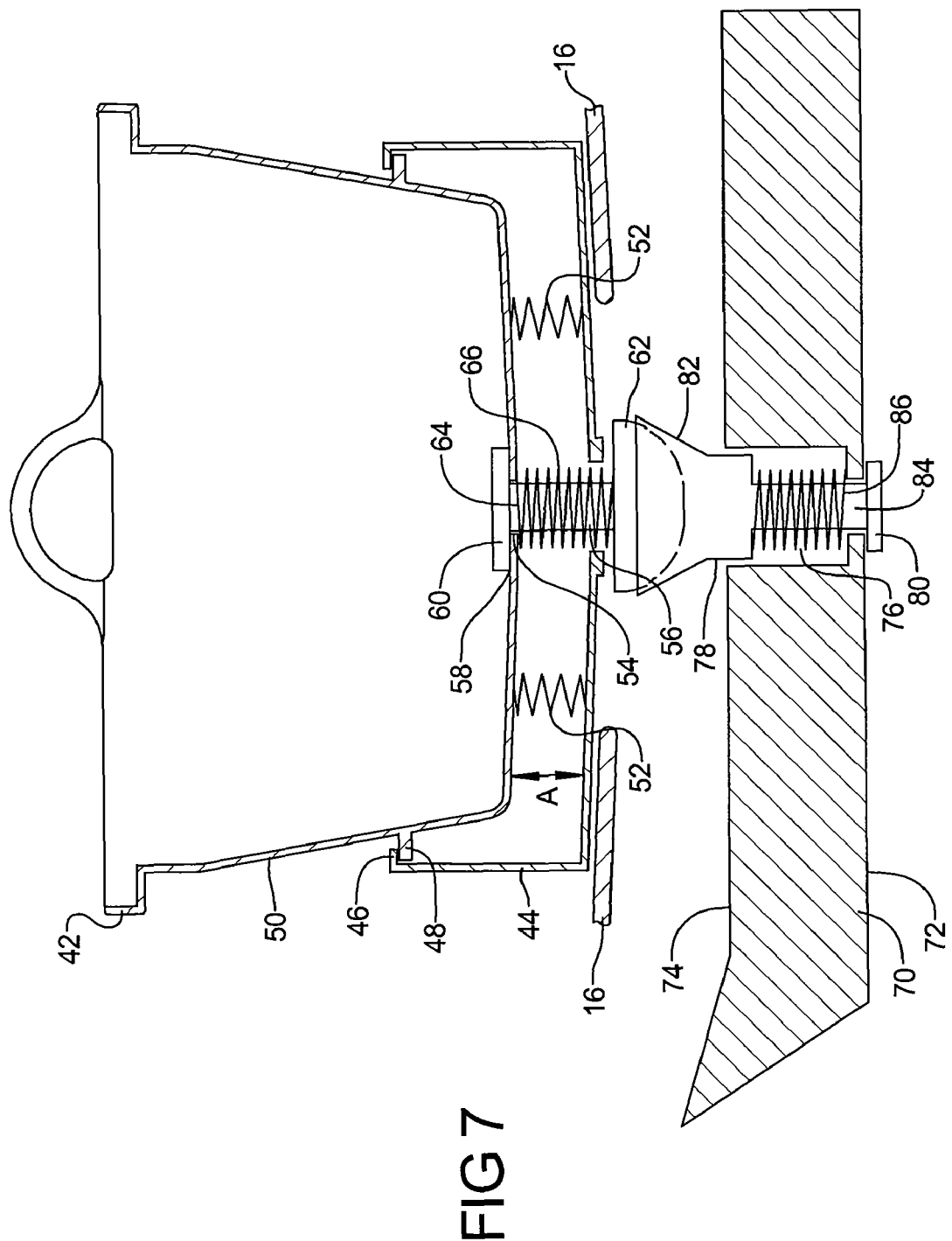
FIG. 7 depicts a cross-sectional view of the carafe lid of FIG. 6 positioned under the brew basket assembly.

In a method of use, the brew basket assembly 40 can be used to delay the release of the brewed coffee into the carafe 18. Referring to FIG. 7, the brew basket assembly 40 is positioned in the brew basket housing 16. The carafe 18 is positioned under the brew basket 16, where the input head 82 of the lid valve 78 in the carafe lid 70 is aligned with and proximal to the output head 62 of the basket valve 58 in the brew basket assembly 40. The approximation of the input head 82 and output head 62 does not provide a force to compress the springs 66 and 86. As a result, the basket valve 58 and lid valve 78 remain closed, where the seals 60 and 80 are seated, sealing the apertures 54 and 76.

Coffee grounds are placed within the upper basket portion 42. The coffee grounds are initially provided in a dry state, having a weight less than that of the threshold weight. In this manner, the bias members 52 maintain the upper basket portion 42 the distance "A" from the lower basket portion 44. The placement of the dry coffee grounds within the upper basket portion 42 dose not affect the basket valve 58 and lid valve 78, such that the seals 60 and 80 remain seated and the apertures 54 and 76 sealed.

During the brewing process hot water is introduced into the upper basket portion 42, onto the dry coffee grounds. The hot water wets the coffee grounds, increasing the weight of the coffee grounds. As hot water accumulates within the upper basket portion 42, the temperature within the upper basket portion 42 increases. The combined weight of the wetted coffee grounds and accumulated water will increase, eventually exceeding the threshold weight of the bias member 52. This effectively delays the release of the brewed coffee for a set time period, where the time period is related to the flow of hot water into the upper basket portion 42.

When the combined weight of the wetted coffee grounds and accumulated water exceeds the threshold weight of the bias members 52, the bias members compress, initiating the downward movement of the upper basket portion 42 with respect to the lower basket portion 44. The downward movement of the upper basket portion 42, simultaneously results in a downward movement of basket valve 58.

Figure 8:
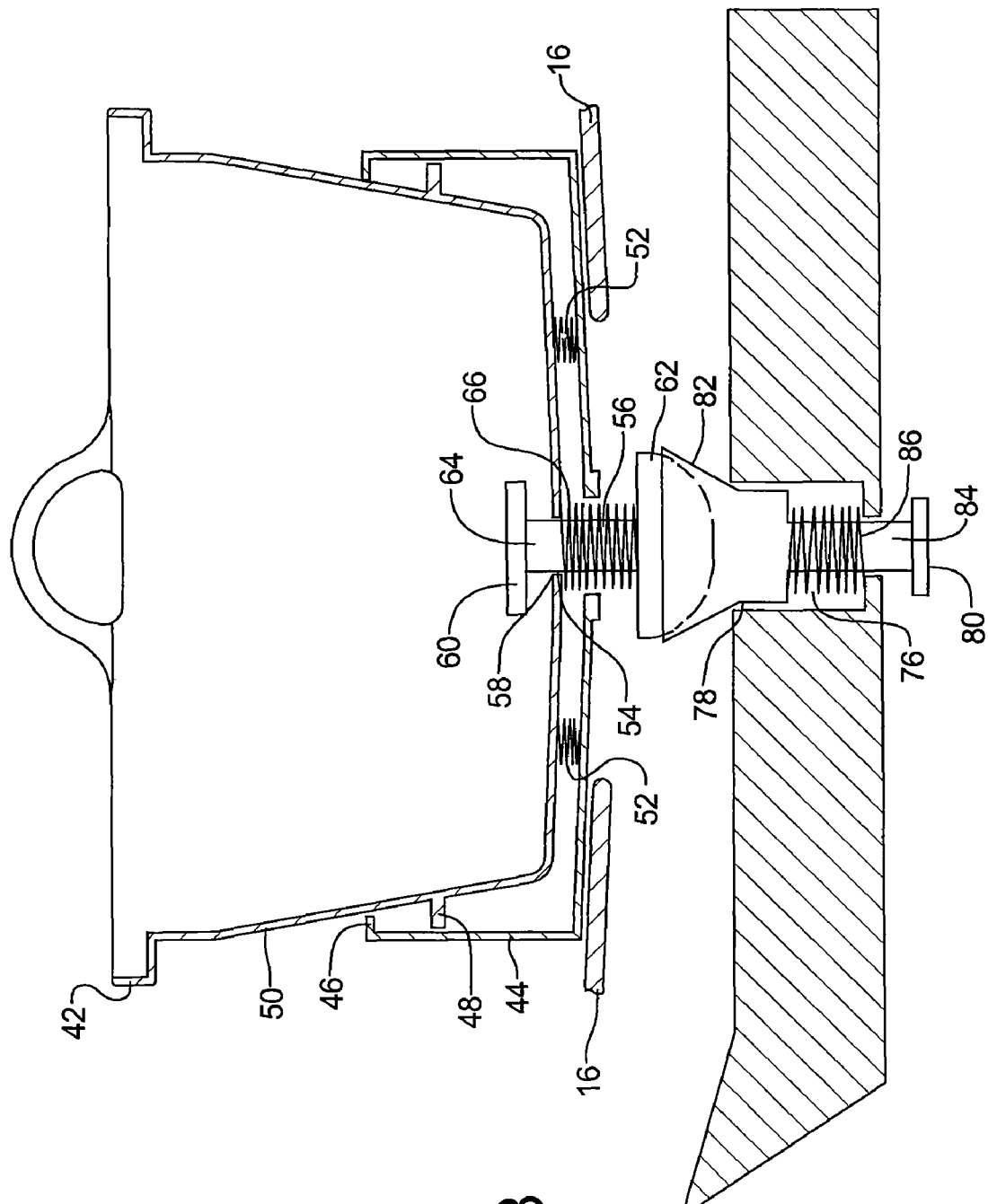
FIG. 8 depicts a cross-sectional view of the carafe lid of FIG. 6 positioned under the brew basket assembly in a weighted position.

Referring to FIG. 8, as the upper basket portion 42 moves downward the output head 62 and input head 82 abut, resulting in an application of force between the output head 62 and the input head 82. As the upper basket portion 42 moves downward, the applied force eventually exceeds that spring forces of springs 66 and 86, resulting in an open of the basket valve 58 and lid valve 78. When the basket valve 58 and lid valve 78 open the seals 60 and 80 are unseated, opening the apertures 54 and 76.

The opening of the apertures 54 and 76 provides a pathway though which the brewed coffee can flow from the brew basket assembly 40 into the carafe 18. As the brewed coffee flows from the brew basket assembly 40, the weight of the wetted coffee grounds and accumulated water will decrease. When the weight of the wetted coffee grounds and accumulated water decreases below that of the threshold weight, the bias members 52 raise the upper basket portion 42 with respect to the lower basket portion 44. This results in a decrease in the application of force between the output head 62 to the input head 82. The applied force eventually decreases below that of the spring forces of springs 66 and 86 resulting in a closing of the basket valve 58 and lid valve 78, where seals 60 and 80 are reseated over the apertures 54 and 76.

Figure 9:
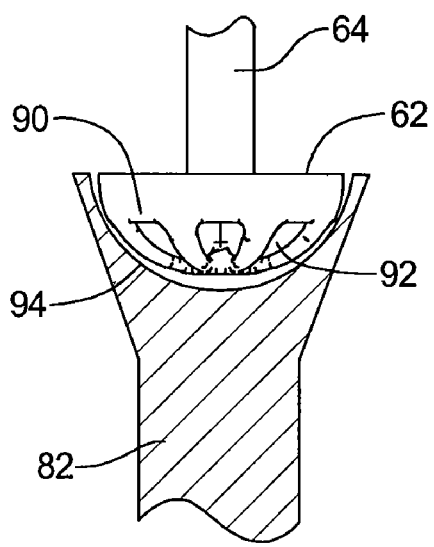
FIG. 9 depicts a cross-sectional view of the input and output head configuration of the valves of the present disclosure.

Referring to FIG. 9, the output head 62 of basket valve 58 can include a convex outer surface 90 substantially hemi-spherical in shape. The outer surface 90 is slotted or perforated 92 to allow the brewed coffee to pass there through. The input head 82 of lid valve 78 can include a concave surface 94 substantially hemi-spherical in shape, wherein the concave surface 94 is configured to receive the convex surface 90 therein. The concave surface 94 can include slots or perforations to allow the brewed coffee to pass there through. In use, the convex outer surface 90 of the output head 62 will be seated within the concave surface 94 for the input head 82, thus protecting the dripping coffee from the impeding cold air.

Figure 10:
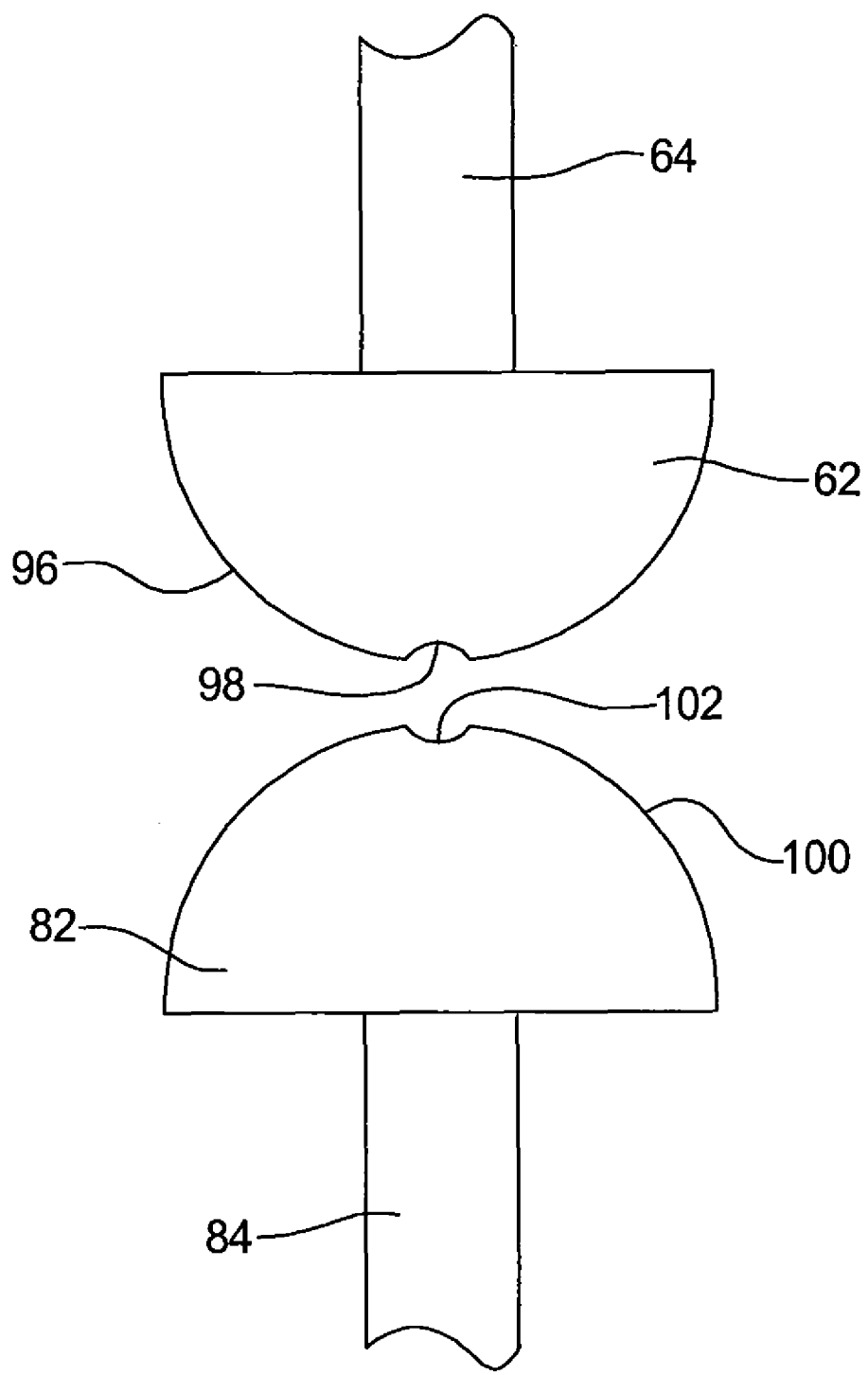
FIG. 10 depicts another input and output head configuration of the valves of the present disclosure.

Referring to FIG. 10, the output head 62 of basket valve 58 can include a convex outer surface 96 substantially hemi-spherical in shape. The outer surface 96 includes a central exit aperture 98 to allow the brewed coffee to pass there through. The input head 82 of lid valve 78 can include a convex outer surface 100 substantially hemi-spherical in shape. The outer surface 100 includes a central input aperture 102 to allow the brewed coffee to pass there through. The exit and input apertures 98 and 102 are aligned, such that the brewed coffee can pass there through. In use, the output head 62 abuts the input head 82, where the aligned exit and input apertures 98 and 102 are in contact, thus protecting the dripping coffee from the impeding cold air.

The above disclosed output and input heads 62 and 82 configurations are only exemplary in nature. It is further contemplated that the output and input heads 62 and 82 can take any configuration allowing for the passage of the brewed coffee there through.

Figure 11:
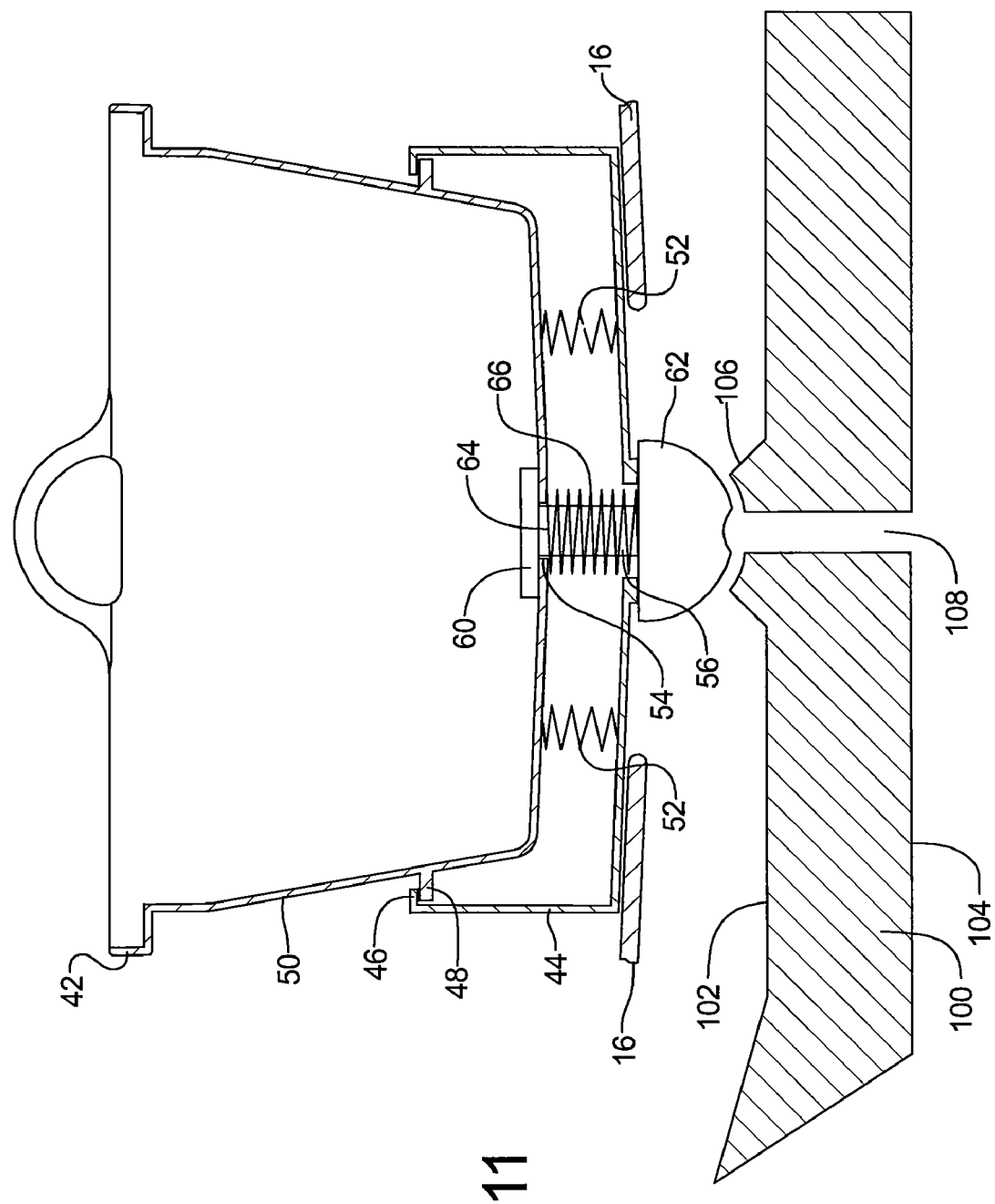
FIG. 11 depicts a cross-sectional view of another carafe lid positioned under the brew basket assembly.
Figure 12:
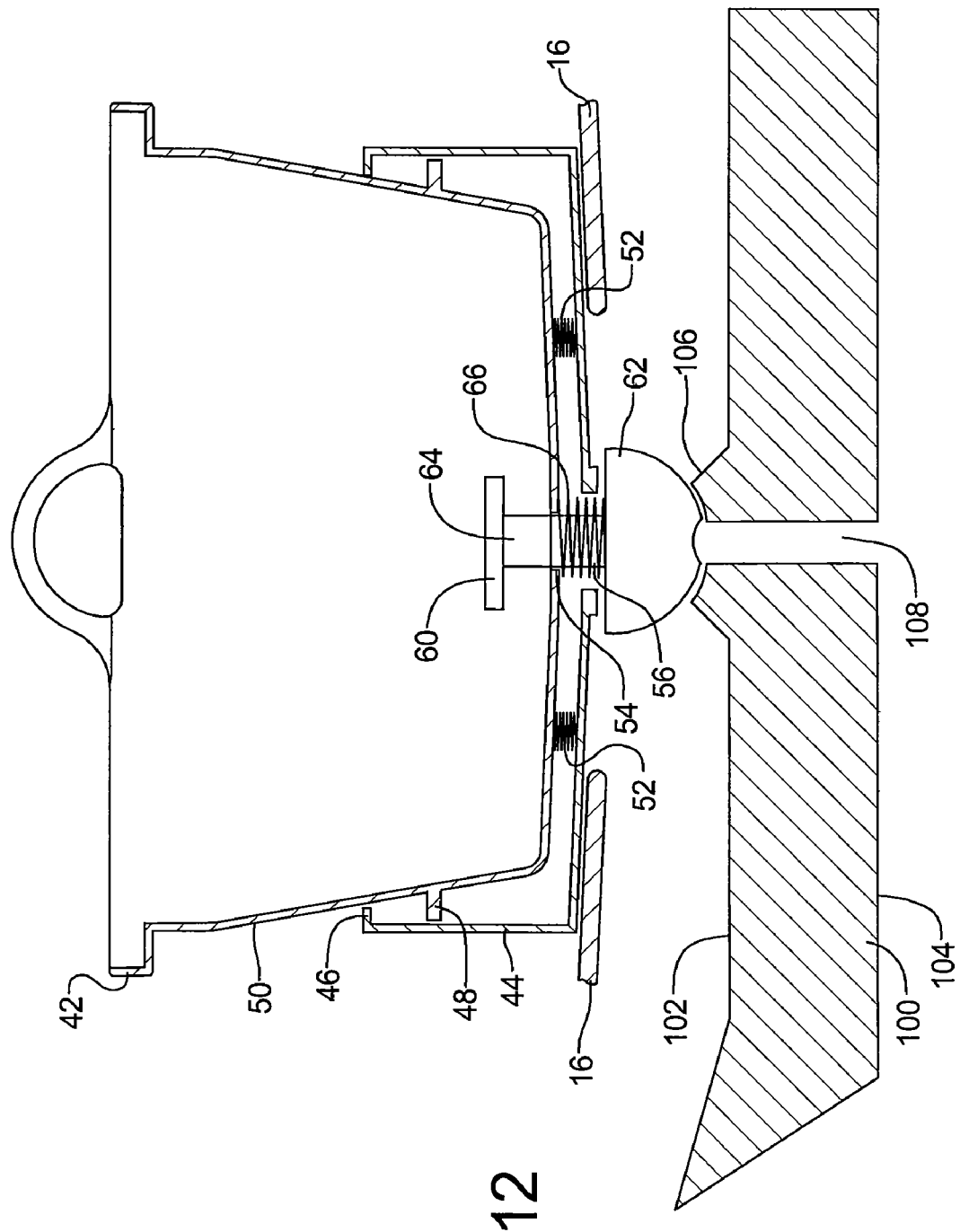
FIG. 12 depicts a cross-sectional view of the carafe lid of FIG. 12 positioned under the brew basket assembly in a weighted position.

Referring to FIGS. 11-12, a carafe lid 100 includes outer and inner surfaces 102, 104, where the outer surface 104 has an input aperture 108 there through. The outer surface 102 can include a dais 106, through which the input aperture 108 defines a pathway between the outer and inner surface 102, 104. The dais 106 can include a flat, concave, or convex face 110

In a method of use, the carafe 18 is positioned under the brew basket 16, where input aperture 108 is aligned with and proximal to the output head 62 of the basket valve 58 in the brew basket assembly 40. The approximation of input aperture 108 and output head 62 does not provide a force to compress the spring 66 in the basket valve 58. As a result, the basket valve 58 remains closed, where the seal 60 is seated, sealing the aperture 54.

Coffee grounds are placed within the upper basket portion 42. The coffee grounds are initially provided in a dry state, having a weight less than that of the threshold weight. In this manner, the bias members 52 maintain the upper basket portion 42 the distance "A" from the lower basket portion 44. The placement of the dry coffee grounds within the upper basket portion 42 dose not affect the basket valve 58, such that the seal 60 remains seated and the aperture 54 sealed.

During the brewing process hot water is introduced into the upper basket portion 42, onto the dry coffee grounds. The hot water wets the coffee grounds, increasing the weight of the coffee grounds. As hot water accumulates within the upper basket portion 42, the temperature within the upper basket portion 42 increases. The combined weight of the wetted coffee grounds and accumulated water will increase, eventually exceeding the threshold weight of the bias member 52. This effectively delays the release of the brewed coffee for a set time period, where the time period is related to the rate of flow of hot water into the upper basket portion 42.

When the combined weight of the wetted coffee grounds and accumulated water exceeds the threshold weight of the bias members 52, the bias members 52 compress, initiating the downward movement of the upper basket portion 42 with respect to the lower basket portion 44. The downward movement of the upper basket portion 42 simultaneously results in a downward movement of basket valve 58 with respect to the outer surface 102 of the carafe lid 100.

As the upper basket portion 42 moves the output head 62 downwardly onto the outer surface 102 of the carafe lid 100, an opposing force is applied to the output head 62 from the outer surface 102 of the carafe lid 100. The applied force eventually exceeds the spring force of the basket valve spring 66, resulting in an opening of the basket valve 58. When the basket valve 58 opens, seal 60 is unseated, opening the aperture 54.

The opening of the exit aperture 54, and alignment with the input aperture 108 with the exit aperture 54, provides a pathway though which the brewed coffee can flow from the brew basket assembly 40 into the carafe 18. As the brewed coffee flows from the brew basket assembly 40, the weight of the wetted coffee grounds and accumulated water in the upper basket portion 42 will decrease. When the weight of the wetted coffee grounds and accumulated water in the upper basket portion 42 decreases below that of the threshold weight, the bias members 52 raise the upper basket portion 42 with respect to the lower basket portion 44. This results in a decrease in the application of force between the outer surface 102 of the carafe lid 100 and the output head 62. The applied force eventually decreases below that of the spring force of spring 66, resulting in a closing of the basket valve 58, where seal 60 is reseated over the apertures 54 and 76.

The present disclosure is related to a drip type coffee maker. However, it is contemplated that the herein described delay release mechanism can be used in any drip type beverage brewing device.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A coffee maker comprising:
   a brew basket housing;
   a brew basket assembly positionable in the brew basket housing and including,
      a lower basket portion having a first exit aperture,
      an upper basket portion vertically movably mounted with respect to the lower basket portion and having a second exit aperture, the second exit aperture having fluid communication with the first exit aperture,
      a bias member interposed between the lower and upper basket portions, the bias member vertically biasing the upper basket portion from the lower basket portion when the upper basket portion includes a weight below a threshold weight of the bias member, and
      a basket valve positioned adjacent to the first and second exit apertures, the basket valve being actuatable between an open and a closed position; and
   a carafe including a lid portion having a lid aperture, the carafe being removably positionable under the brew basket housing, wherein the lid aperture is proximal to the basket valve when the carafe is positioned under the brew basket housing.

2. A coffee maker as set forth in claim 1, wherein the bias member compresses when the weight within the upper basket portion exceeds the threshold weight, decreasing the distance between the upper and lower basket portions.

3. A coffee maker as set forth in claim 2, wherein the decreasing distance between the upper and lower basket portions actuates the basket valve to the open position.

4. A coffee maker as set forth in claim 3, wherein when the weight within the upper basket portion decreases below the threshold weight the bias member expands, increasing the distance between the upper and lower basket portions.

5. A coffee maker as set forth in claim 4, wherein the increasing distance between the upper and lower basket portions actuates the basket valve to the closed position.

6. A coffee maker as set forth in claim 5, further comprising a lid valve positioned adjacent to the lid aperture, where the lid valve is proximal to the basket valve when the carafe is positioned under the brew basket housing.

7. A coffee maker as set forth in claim 6, wherein the decreasing distance between the upper and lower basket portions actuates the basket valve and the lid valve to the open position.

8. A coffee maker as set forth in claim 7, wherein the increasing distance between the upper and lower basket portions actuates the basket valve and the lid valve to the closed position.

9. A brew basket assembly for use with a coffee maker comprising:
   a lower basket portion having a first exit aperture,
   an upper basket portion vertically movably mounted with respect to the lower basket portion and having a second exit aperture, the second exit aperture having fluid communication with the first exit aperture,
   a bias member interposed between the lower and upper basket portions, the bias member vertically biasing the upper basket portion from the lower basket portion when the upper basket portion includes a weight below a threshold weight of the bias members, and
   a basket valve positioned adjacent to the first and second exit apertures, the basket valve being actuatable between an open and a closed position.

10. A brew basket assembly as set forth in claim 9, wherein the bias member compresses when the weight within the upper basket portion exceeds the threshold weight, decreasing the distance between the upper and lower basket portions.

11. A brew basket assembly as set forth in claim 10, wherein the decreasing distance between the upper and lower basket portions actuates the basket valve to the open position.

12. A brew basket assembly as set forth in claim 11, wherein when the weight within the upper basket portion decreases below the threshold weight the bias member expands, increasing the distance between the upper and lower basket portions.

13. A brew basket assembly as set forth in claim 12, wherein the increasing distance between the upper and lower basket portions actuates the basket valve to the closed position.

14. A method of preparing a brewed beverage, comprising:
   providing a brewing container including a first portioned biased with respect to a second portion, wherein a biasing of the first portion with respect to the second portion delays the release of the infused hot water brewing container;
   positioning a dried beverage material in the brewing container;
   providing hot water into brewing container;
   collecting the hot water in the brewing container;
   infusing the hot water with the dried beverage material;
   delaying the release of the infused hot water from the beverage container; and
   releasing the infused hot water from the brewing container when a combined weight of the hot water and dried beverage material in the brewing container exceed a predetermined weight, including moving the first portion with respect to the second portion when a combined weight of the hot water and dried beverage material in the brewing container exceed a predetermined weight.

15. A method of preparing a brewed beverage as set forth in claim 14, wherein a un-biasing of the first portion with respect to the second portion releases of the infused hot water from the brewing container.

16. A method of preparing a brewed beverage as set forth in claim 15, wherein the first portion is un-biased with respect to the second portion when the combined weight of the hot water and dried beverage material in the brewing container exceeds the predetermined weight.

* * * * *